Dec. 24, 1935.　　　H. R. TEAR　　　2,025,230
LUBRICATING DEVICE
Filed Nov. 30, 1934　　　2 Sheets-Sheet 2

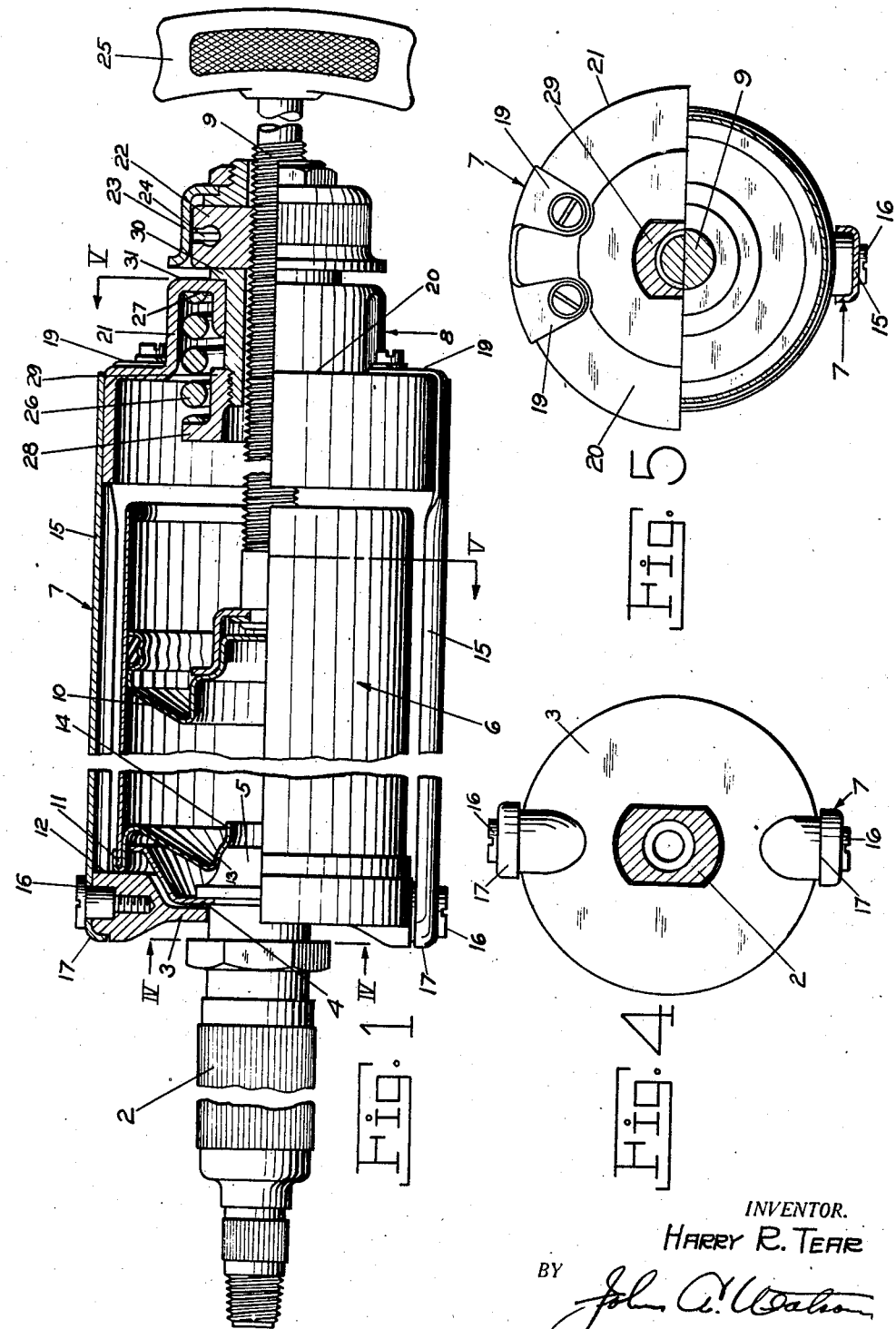

INVENTOR.
HARRY R. TEAR
BY
ATTORNEY.

Patented Dec. 24, 1935

2,025,230

UNITED STATES PATENT OFFICE 2,025,230

LUBRICATING DEVICE

Harry R. Tear, Evanston, Ill., assignor to The Lubrication Corporation, Chicago, Ill., a corporation of Delaware Application November 30, 1934, Serial No. 755,256

15 Claims. (Cl. 221—47.3)

This invention relates to improvements in lubricating devices and more particularly to lubricating guns using interchangeable lubricant cartridges as a source of lubricant supply.

An object of the invention is to provide an improved lubricating gun of the character described, wherein an interchange of lubricant cartridges for the gun may be carried out without detaching and removing any of the gun parts.

Another object is to provide an improved lubricating gun, as described, wherein the side wall of the cartridge when in place in the gun remains visible so that the user may determine at a glance that the cartridge is installed and may read any identifying names, symbols, or indicia imprinted upon the cartridge wall thus to ascertain the character of the lubricant contained within the cartridge.

A further object is to provide an improved lubricating gun, as described, incorporating mechanism for visibly indicating to the user the existence of a pressure on the lubricant within the cartridge in excess of a predetermined value thereby to minimize the possibility of placing the cartridge under harmful internal pressure during operation of the gun.

Other objects, the advantages, and uses of the invention will be, or should be, apparent after reading the following specification and claims and after consideration of the drawings forming a part of this specification wherein:

Fig. 1 is a broken side elevation partially in section illustrating a hand lubricant gun constructed in accordance with the invention;

Fig. 4 is a sectional view along the line IV—IV of Fig. 1; and

Fig. 5 is a sectional view along the line V—V of Fig. 1.

Figure 3:
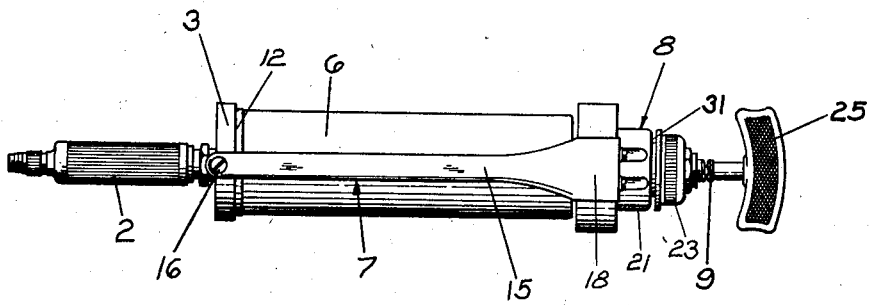
Fig. 3 is a view, similar to Fig. 2, illustrating the gun in readiness for use.

In general the lubricating gun selected for illustration herein comprises, a high pressure lubricant pump 2 of the "push" type floatingly mounted upon a circular head plate 3, means including a cartridge connector plate 4 and a cartridge connector stud 5 both fixed against movement upon a portion of the pump 2 located on the inner side of the head plate 3, an interchangeable lubricant cartridge 6 adapted for detachable engagement with the connector plate 4 and sealing engagement with the cartridge connector stud 5, a substantially rigid stirrup 7 pivotally supported upon the head plate 3 at diametrically opposite sides thereof, and mechanism 8 at the rearward end of the stirrup for the support of, and engagement with, a hand feed screw 9 for urging the cartridge piston 10 against the lubricant contents of the cartridge thus to charge the pump cylinder with lubricant.

The pump 2 may be constructed in the manner disclosed and claimed in the copending application of A. Y. Dodge and Harry R. Tear, Serial No. 727,604, filed May 26, 1934, and the floating mounting between the pump 2 and head plate 3 may be of the character disclosed and claimed in my copending application Serial No. 743,123, filed September 17, 1934. The purpose of the floating connection between the head plate 3 and the pump 2, including the connector plate 4 and the cartridge connector stud 5, is to permit the leading edge 11 of the side wall of the cartridge 6 to bear directly upon the inner wall 12 of the head plate thus to relieve thrust which might otherwise be applied to the wall 13 of the cartridge outlet opening 14 by the stud 5 during the time that mechanical thrust is applied to the piston 10 as by operation of the hand screw 9.

The stirrup 7 upon which the hand screw assembly is mounted may comprise a pair of relatively rigid metal straps 15 pivotally mounted, at their forward ends, upon diametrically opposite wall portions of the head plate 3 and secured against displacement therefrom by screws 16. The forward ends of the straps 15 may be turned laterally toward the center of the head plate as shown at 17 thereby to provide contact surfaces between the head plate and the straps for the purpose of bearing counter-thrust applied between stirrup and head plate during the operation of the hand screw 9. The rearward ends of the straps 15 are preferably of increased width as indicated at 18 and formed with laterally extending portions 19 adapted to overlie a shoulder 20 formed in a rigid metal body 21 upon which the screw supporting mechanism 8 is carried.

Figure 2:
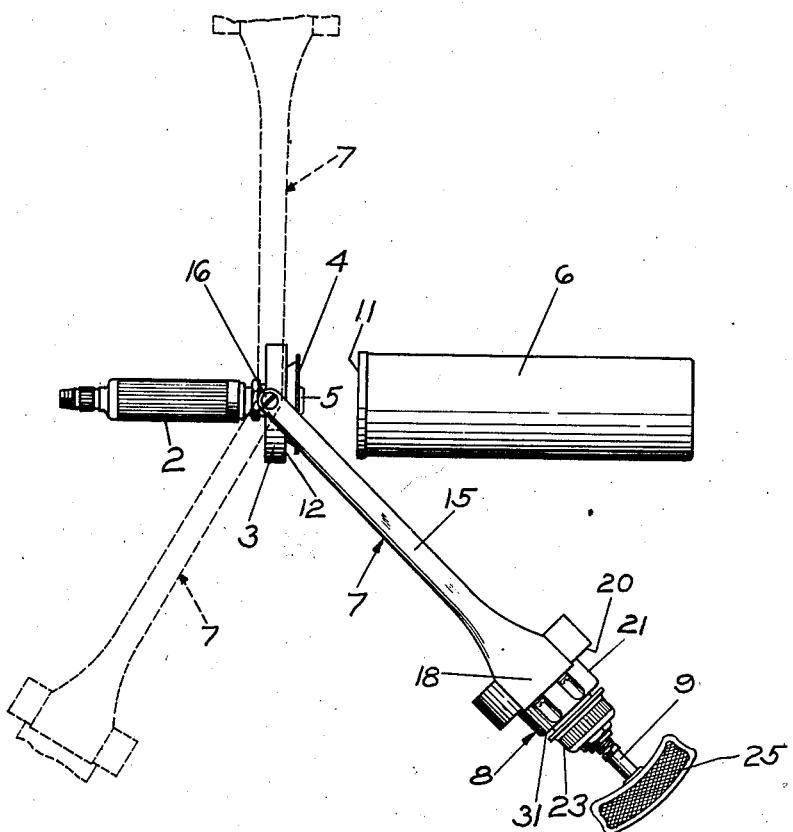
Fig. 2 is a plan view of the gun and cartridge as they appear during the interchange of cartridges.

It will be apparent from the foregoing description that if the hand screw 9 is retracted out of engagement with the piston so as to lie clear of the end of the cartridge 6, relative pivotal movement between the pump assembly and the stirrup 7 may take place to permit the parts to assume the position shown in Fig. 2. With the parts in the latter position quick detachment and attachment of the cartridge 6 for purposes of an interchange of cartridges may be carried out with the utmost ease and without disassembly of any of the gun parts. After an interchange of cartridges has taken place either for the purpose of substituting a fresh cartridge for one that is exhausted or to change to another type of lubricant, it is a relatively simple operation to swing the stirrup 7 so that the hand screw 9 is again in axial registration with the cartridge and thereupon to operate the hand screw to place the lubricant in the cartridge under low pressure as previously set forth.

The screw-engaging mechanism 8 carried by the stirrup 7 may include a manually operated "clutch" comprising a member 22 mounted for movement transversely of the feed screw 9 and having threads at one end thereof complementary to the threads of the screw 9. The member 22 may be urged toward the screw by rotation of a clutch operating cam 23 mounted eccentrically about the axis of the sleeve 30, a band spring 24 tending normally to urge the threaded end of the member 22 out of engagement with the screw. In operation the clutch mechanism functions to release the feed screw 9 so that the screw may be withdrawn from within the cartridge 6 without the necessity of turning the handle 25, which may be mounted upon the rearward end of the screw 9 to facilitate manual withdrawal or rotation of the screw.

In addition to the clutch mechanism for providing quick release and withdrawal of the feed screw 9, I have incorporated in the feed screw mechanism 8, a preloaded compression spring 26 arranged between the inner end wall 27 of the body 21 and a flanged portion 28 of a tubular nut 29 attached to the inner end of the sleeve 30 slidably mounted in the body 21. The purpose of the spring 26 and its relationship with respect to the member 22, sleeve 30 and body 21, is to enable the operator, upon turning the feed screw, to place the piston 10 under a load represented by the force of the spring 26 when compressed. The force exerted by the spring 26 at any time prior to total collapsing of the spring may be indicated to the user by the width of the gap between the adjacent portions of the cam member 23 and the rearmost end 31 of the body member 21. The user of the gun may be instructed not to load the cartridge piston 10 an amount greater than represented by the increase of the aforesaid specified distance, for example, one-quarter of an inch beyond its normal width.

In operation my improved lubricating gun possesses the advantage of enabling the user to see the side wall of the cartridge 6 thereby to identify the cartridge contents as by reading any indicia, names or symbols upon the cartridge wall. An added advantage is that the lubricating gun when used in the service stations of oil companies having their own brands of lubricant may make use of identifying labels imprinted upon the cartridge walls and the owner of the motor vehicle upon which the lubricant servicing operation is being performed may thus be assured that the band and type of lubricant called for is actually used.

When it is desired to change cartridges, as to replace one from which the contents have been exhausted, or to change to another type of lubricant, the operator has only to turn the cam 23, to withdraw the hand screw 9 and to swing the stirrup 7 together with the hand screw mechanism out of alignment with the cartridge, as shown in Fig. 2. With the gun thus "broken" it is a relatively simple operation to detach the cartridge and to insert another. During the interchanging of cartridges it is unnecessary to detach and remove any part of the gun and the misplacing or mutilation of the gun parts as by falling from the hands of the operator is thereby eliminated.

While I have herein disclosed certain specific embodiments of my invention, it is to be understood that such specific disclosure is illustrative only and that I do not limit myself to the details illustrated and described, except as defined in the following claims.

I claim:

1. In a lubricating device, a lubricant pump, an interchangeable lubricant supply cartridge having a piston therein, means for detachably mounting said cartridge on said pump and for establishing lubricant communication between said pump and cartridge, and cartridge-piston-operating mechanism including means pivotally mounted relatively to said pump, and adapted to be swung about its pivotal axis into and out of alignment with said cartridge, when the cartridge is mounted upon the pump.

2. In a lubricating device, a lubricant pump, an interchangeable lubricant supply cartridge having a piston therein, means for detachably mounting said cartridge on said pump and for establishing lubricant communication between said pump and cartridge, means comprising a skeleton frame extending about said cartridge and secured at its forward end to said pump, and a cartridge-piston-operating mechanism carried by said frame for urging said piston against the lubricant contents of the cartridge.

3. In a lubricating device, a lubricant pump, an interchangeable lubricant supply cartridge having a piston therein, means for detachably mounting said cartridge on said pump and for establishing lubricant communication between said pump and cartridge, means comprising a skeleton frame extending about said cartridge and secured at its forward end to said pump, and a cartridge-piston-operating mechanism carried by said frame for urging said piston against the lubricant contents of the cartridge, said frame being movable at will relatively to said pump and cartridge mounting means to cause said piston operating mechanism to move out of registration with said cartridge.

4. A lubricating device comprising a lubricant pump, means for detachably mounting a lubricant supply cartridge upon said pump, mechanism for applying thrust to a part of said cartridge for placing the contents thereof under low pressure, and a skeleton frame pivotally mounted relatively to said pump at one end and fixed relatively to said thrust-applying mechanism at its opposite end, whereby the outer end of the frame carrying said mechanism may be swung through an arc toward or away from said cartridge when the cartridge is mounted upon said pump.

5. In a lubricating device, a pump, a lubricant supply cartridge having a piston, means facilitating quick attachment and detachment of said cartridge to and from said pump, a skeleton frame comprising a pair of parallel straps each pivotally connected at its forward end relatively to said pump and disposed in parallel relationship to the axis of said cartridge one on either side of the cartridge, and a manually operated mechanism supported upon the rearward ends of said straps and engageable with said piston in said cartridge for urging the cartridge piston against the lubricant contents of the cartridge.

6. In a lubricating device a removable cartridge having a piston therein, mechanism for urging the piston of the cartridge against the lubricant contents thereof comprising, a member slidably mounted for movement along the axis of said cartridge, a screw-engaging member carried by said first-named member, a spring normally urging said first-named member toward the piston of said cartridge, and a feed screw engaging with said screw-engaging member and having its forward end adapted to bear upon said cartridge piston.

7. In a lubricating device, a lubricant pump, an interchangeable lubricant supply cartridge, means for detachably mounting said cartridge on said pump and for establishing lubricant communication between the pump and cartridge, a skeleton frame mounted on said pump including members extending parallel with opposite sides of said cartridge when the cartridge is mounted upon the pump, and means associated with said frame and with said cartridge for placing the lubricant in the cartridge under pressure.

8. In a lubricating device, a lubricant pump, an interchangeable lubricant supply cartridge, means for detachably mounting said cartridge on said pump and for establishing communication between said pump and said cartridge, and lubricant-feeding means for expelling the lubricant from said cartridge into said pump pivotally mounted with respect to said pump and adapted to be swung into or out of operative alignment with said cartridge when the cartridge is mounted upon the pump.

9. In a lubricant gun, a lubricant pump, means for securing a lubricant container relative to said pump for supplying lubricant thereto, means for exerting pressure on lubricant in said container, and means hinging said pump and pressure exerting means together for relative swinging movement.

10. A lubricating device comprising a lubricant pump, means for detachably securing a lubricant supply cartridge to the pump, a stirrup pivoted to the pump, and a feed screw carried by the stirrup and adapted to engage said cartridge to eject lubricant therefrom into the pump.

11. A lubricating device comprising a lubricant pump, means for detachably securing a lubricant supply cartridge to the pump, a stirrup pivoted to the pump, a spring pressed sleeve carried by said stirrup at the end thereof remote from the pump and a feed screw threaded through said sleeve and engageable with the cartridge for ejecting lubricant therefrom.

12. A lubricating device comprising a lubricant pump having an inlet, means for detachably securing a lubricant supply cartridge rigidly to the pump with its outlet in communication with the pump inlet, and means pivotally secured to said pump and movable into and out of alignment with the cartridge, said means including mechanism for forcing lubricant from the cartridge into the pump.

13. A lubricating device comprising an elongated substantially cylindrical pump, means for rigidly securing a cylindrical lubricant cartridge coaxially to said pump, a stirrup pivoted to said pump and adapted to swing into alignment with said pump and cartridge, and means carried by said stirrup at the end thereof remote from the pump for forcing lubricant from the cartridge.

14. In a lubricating device, means for dispensing lubricant from a container comprising a sleeve slidably mounted for movement axially of the container, resilient means for urging said sleeve toward the container, a feed screw extending through the sleeve and engageable with the container, a screw engaging member carried by the sleeve and movable into and out of engagement with the feed screw, and cam means carried by the sleeve for moving the screw engaging member.

15. In a lubricating device, means for dispensing lubricant from a container comprising a sleeve slidably mounted for movement axially of the container, resilient means for urging said sleeve toward the container, a feed screw extending through the sleeve and engageable with the container, a screw engaging member carried by the sleeve and movable into and out of engagement with the feed screw, and an eccentric surrounding the feed screw and carried by said sleeve for moving said screw-engaging member into engagement with the feed screw.

HARRY R. TEAR.